United States Patent [19]

Barry

[11] 4,292,129
[45] Sep. 29, 1981

[54] MONITORING OF OPERATING PROCESSES

[75] Inventor: Robert F. Barry, Sint Genesius Rode, Belgium

[73] Assignee: Westinghouse Electric Corp., Pittsburgh, Pa.

[21] Appl. No.: 11,986

[22] Filed: Feb. 14, 1979

[51] Int. Cl.³ .................................... G21C 7/00
[52] U.S. Cl. ................................ 176/24; 176/20 R; 364/504
[58] Field of Search ............... 176/24, 20 R; 364/504

[56] References Cited

U.S. PATENT DOCUMENTS 3,423,285  1/1969  Curry ........................................ 176/24
3,931,500  1/1976  Berkebile ................................ 176/24

OTHER PUBLICATIONS

Zwingelstein et al. Transactions of the ANS Annual Meeting 1976, pp. 579–580.

Primary Examiner—Donald P. Walsh
Attorney, Agent, or Firm—Daniel C. Abeles

[57] ABSTRACT

Apparatus for monitoring the processes of a nuclear reactor to detect off-normal operation of any process and for testing the monitoring apparatus. The processes are evaluated by response to their paramters, such as temperature, pressure, etc. The apparatus includes a pair of monitoring paths or signal-processing units. Each unit includes facilities for receiving on a time-sharing basis, a status binary word made up of digits each indicating the status of a process, whether normal or off-normal, and test-signal binary words simulating the status binary words. The status words and test words are processed in succession during successive cycles. During each cycle, the two units receive the same status word and the same test word. The test words simulate the status words both when they indicate normal operation and when they indicate off-normal operation. Each signal-processing unit includes a pair of memories. Each memory receives a status word or a test word, as the case may be, and converts the received word into a converted status word or a converted test word. The memories of each monitoring unit operate into a non-coincidence which signals non-coincidence of the converted word out of one memory of a signal-processing unit not identical to the converted word of the other memory of the same unit. The converted test words are processed only in the signal-processing units where they originate. Each signal-processing unit also includes elapsed-time signalling facilities which signal if it detects no signal a predetermined time interval after a cycle or processing of status words and test words has been initiated. The converted status words are transmitted to an evaluating unit for determination if off-normal operation exists. This evaluating unit also receives digit indications of faults in the signal-processing units, either by reason of non-coincidence or elapsed-time signalling. The protective apparatus for the reactor is actuated on the evaluation by the evaluating unit of off-normal operation or of faulty operation in both of the signal-processing units.

14 Claims, 7 Drawing Figures

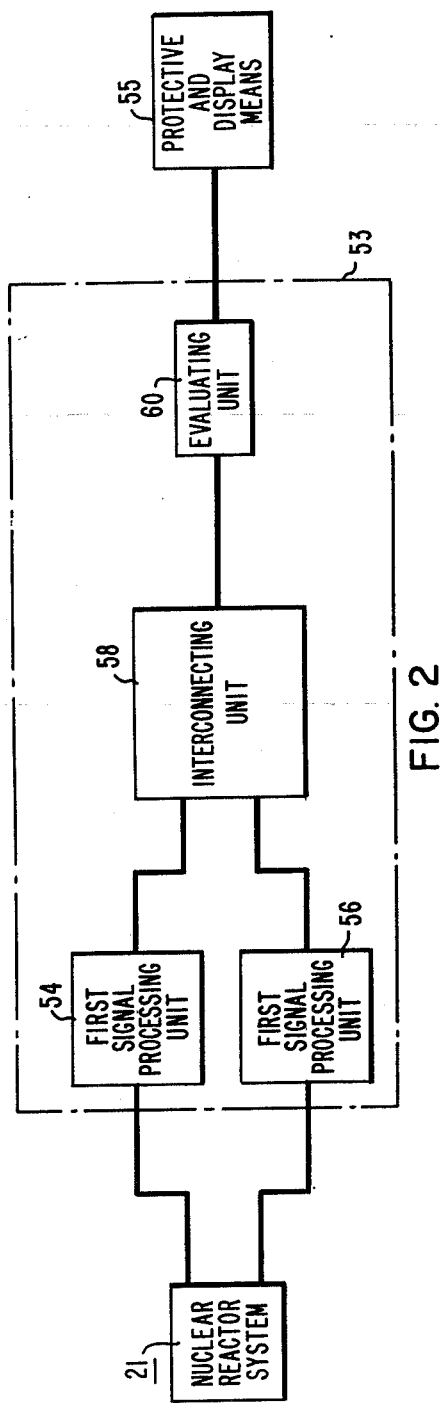
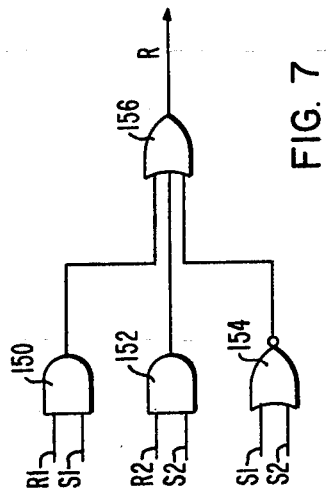

MONITORING OF OPERATING PROCESSES

BACKGROUND OF THE INVENTION

This invention relates to the monitoring of processes which demand of the monitor a high standard of performance and reliability. The invention has particular relationship to the monitoring of vital processes of nuclear reactor systems for supplying power. Such nuclear reactor systems include in addition to a nuclear reactor auxiliary apparatus such as steam generators, pressurizers, feed-water heaters, turbines, etc. This invention is uniquely and intimately applicable to the monitoring of nuclear reactor systems. In the interest of facilitating the understanding of this invention by dealing in concrete monitoring problems, this application is, to a large extent, confined to the problems of monitoring the operational processes of nuclear reactor systems. To the extent that the teaching of this invention is analogously, uniquely and intimately applicable to other systems, apparatus and processes, such application is within the scope of this application and within the scope of equivalents of the claims of any patent which may issue on or as a result thereof and the expression "nuclear reactor" or "nuclear reactor system" as it appears in this application and in the claims shall be taken to have general meaning for this purpose.

A number of parameters evaluating operational processes or properties of a nuclear reactor power systems are monitored continuously during its operation. Typically, among these parameters are included the average of the temperatures of the hot coolant flowing out of the reactor to the steam generator and of the cooler coolant returning to the reactor. Where there is a primary loop, as in the pressurized water reactor this is the average of the coolant outflow and return temperatures in the primary loop. A number of such averages may be derived by measuring the outlet and inlet temperatures along different points of the coolant conductors. Alternatively the outlet and inlet temperatures, rather than the average, may be monitored separately. Also included typically is the pressure of the coolant. A number of indications of this pressure may be derived from the pressurizer. The level of the water in the stream generator may be measured by a number of level gauges. Also positions of various switches, relay-contact or contactor or valves, may be monitored, for example, the positions of the switches which control the control-rod actuation apparatus, or the switch which controls the shim. The position of the valve which controls the coolant may be monitored. Compressed coolant, heated coolant, control-rod settings and settings of switches, relays, contactors and valves are referred to herein as operational processes of a nuclear reactor and their parameters are referred to as process states.

The operational processes are referred to in this application as having a status which is said to be normal if the process parameter is within critical limits or the process mechanism is set for normal operation of the reactor and off-normal if the parameter is outside of critical limits or the mechanism is set for off-normal operation. For example, a valve set to block or materially reduce the flow of coolant off-normal.

Monitoring apparatus functions to determine or detect the status of the operational process of a nuclear reactor power system. The nuclear reactor system includes a plurality of means, each responsive to a process state to indicate its status and the monitoring apparatus is responsive to this means.

Since the failure of a nuclear reactor system may lead to repair costs of hundreds of millions of dollars, the monitoring of vital functions must have the utmost dependability and reliability. The monitoring apparatus must meet the highest standards of performance. In fact, such high standards are imposed by the codes and regulations of the governing authorities where nuclear reactor power systems are installed. It is an object of this invention to provide monitoring apparatus meeting these high standards.

Since the ultimate effect of "downstream actions" of the monitoring apparatus is to trip the monitored nuclear station off the electric power grid, it is essential that no spurious operation of the station, induced by a single likely spurious fault, take place. This imposes the requirement of redundancy; i.e., the requirement of providing a plurality of like monitoring units which must respond to produce a tripping action. The expression "downstream action" means action, in the sequence or chain of operations, initiated by monitoring apparatus which occurs further away from the monitoring apparatus than a given reference point. "Upstream action" means action which occurs in this sequence between the reference point and the monitoring apparatus or occurs at the monitoring apparatus itself.

Among the conditions imposed on the monitoring apparatus is that it be tested to assure that its components are functioning properly to maintain the necessary dependability and reliability. The testing must be carried out frequently to achieve these purposes and particularly to detect, as soon as they occur or early thereafter, random failures and environmentally induced common failures. It is desirable, particularly since the testing occurs frequently, that the testing should neither reduce the reliability of the monitoring apparatus nor increase the threat of spurious operation. The demand for frequent testing is thus intimately related to the demand for redundancy.

Monitoring apparatus is made up of logic circuitry with modern digital electronic devices which have the demanded high reliability and performance. It is necessarily desirable that the circuitry and its components have the necessary cost trend. Consideration must also be given to the fact that the logic of the circuitry is changed after installation and importance must be assigned to the facility of making the changes and maintaining their cost at a low level.

In accordance with the teachings of the prior art there are provided testing facilities, external to the logic circuitry of the monitoring apparatus, which monitors the operating process measures. In such prior-art apparatus the testing facilities are more complicated than the operating-process logic circuitry, more difficult to maintain and more difficult and more costly to modify in service. In addition these facilities are operated manually or by a computer requiring that the monitoring apparatus be disconnected during the testing interval.

It is an object of this invention to overcome the drawbacks of the prior art and to provide monitoring apparatus including dependable and reliable and relatively uncomplicated testing apparatus of relatively low cost which shall, without either reducing the reliability of the monitoring apparatus or increasing the threat of spurious operation, permit frequent testing so as to impart confidence in the dependability and reliability of the monitoring apparatus, and detect random failures and environmentally induced common failures of the monitoring apparatus as soon as they occur or early thereafter, and which shall lend itself readily to low cost maintenance and shall readily permit changes in its logic at low cost.

SUMMARY OF THE INVENTION

In accordance with this invention the testing function, instead of being performed by testing facilities separate from the operating-process logic circuitry of the monitoring apparatus, is integrated into the monitor logic circuitry. According to this invention there is provided a monitor or monitoring apparatus for a nuclear power reactor system into which the testing function is integrated.

In the practice of this invention, the monitoring apparatus includes a logic function, which may be part of an input register, which converts the output of each of the plurality of means indicating status of an operating process into a digit. These digits are combined into a binary status word. The monitoring apparatus also includes a generator of test words, each test word simulating a status word. The status words serve to indicate the status of the operational processes of the reactor; the test words serve to test whether the monitoring apparatus is operating properly.

Redundance, the inclusion in the monitoring apparatus of replicated units, is an important incident of monitoring and testing. The relationship of redundance to the testing will now be considered. In particular, consideration will be given to the use of redundancy to maintain the monitor reliably capable of detecting departures of processes from normal. The word "path" will be used to describe one set of the hardware means by which status words or test words are processed or operated upon by logic circuitry. The following cases will be considered in the selection of the necessary number of redundant, parallel, logic paths.

a. One path

This may be described as one-out-of-one "majority" logic. One path, without redundancy, has the same reliability as a system as the path itself has. One path without redundancy is not usually suitable for vital functions.

b. Three paths

Three paths increase the reliability of the apparatus. The diversion of one of the paths to testing has a negligible effect on reliability if the likelihood of faults in each path is sufficiently low that failure of two or more paths (between testing periods where one or more paths is diverted to testing) is so unlikely as to be negligible. The relationship of the paths during a test is shown in the following Table I.

TABLE I

| True Process State Digit | Path & Status | Indicated Status | ⅔ majority logic |
|---|---|---|---|
| 0 | 1. faulty | 0 or 1 | 0 |
|   | 2. okay | 0 |   |
|   | 3. okay | 0 |   |

In the above Table I, the test is for one digit of a status word. It is assumed that for normal operation the digit should be 0; a 1 would indicate off-normal operation. The true process state is therefore indicated by a 0.

It is to be noted that in the case of three paths, the ⅔ system is not falsely actuated by a single failure, nor is it defeated by a single failure. With testing of the individual paths in this case, either it is necessary to take the path out of service or to accept some degradation of performance during the test period. This is shown in the following Table II.

TABLE II

| True Process State Digit | Path & Status | Indicated Status | ⅔ majority logic |
|---|---|---|---|
| 0 | 1. faulty | 0 or 1 | 0 or 1 |
|   | 2. test | 1 |   |
|   | 3. okay | 0 |   |

This shows that the ⅔ majority rule may not give the correct result. The output of the in-test path could be forced to 0 during the test so that the ⅔ majority rule would yield 0; but this technique fails if the true-process state is 1. The ⅔ majority rule would give 0 or 1, which does not meet the objective. The three-path system has the disadvantage that it requires three paths.

c. Four paths

Logic of ⅔ majority plus an on-line spare is suitable to allow testing without degradation of function. The paths may be taken off-line one after the other for testing, and then returned to service. This is demonstrated in the following Table III.

TABLE III

| True Process State Digit | Path & Status | Indicated Status | ⅔ majority logic |
|---|---|---|---|
| 0 | 1. faulty | 0 or 1 | 0 |
|   | 2. test | — |   |
|   | 3. okay | 0 |   |
|   | 4. okay | 0 |   |

Similarly if the true-process state digit is 1, the ⅔ majority will be 1. This has the disadvantage of requiring four paths.

d. Five paths

Logic of 3/5 is suitable to allow testing of individual paths without taking the path out of service. This is shown in the following Table IV.

TABLE IV

| True Process State Digit | Path & Status | Indicated Status | 3/5 logic |
|---|---|---|---|
| 0 | 1. faulty | 0 or 1 | 0 |
|   | 2. test | 0 or 1 |   |
|   | 3. okay | 0 |   |
|   | 4. okay | 0 |   |
|   | 5. okay | 0 |   |

However this has the disadvantage of requiring five paths.

e. Single path with time share testing

If the test can be made rapidly, in comparison with the required response time of the monitored system, and if the test can be made frequently in comparison with the mean time between failures, testing on a time-shared basis is feasible. During the test period, the output would be blocked and the entire system defeated; by definition this is acceptable because the test period is short in comparison with the required response time of the system. In modern electronics systems, the digital circuits work thousands of times faster than the rate of change of the process found in industrial applications.

In this case, two cases must be examined; one during the test period, the second during the non-test period. This comparison is made in Tables V-a and V-b which follow.

TABLE V-a

| | DURING TEST | | |
|---|---|---|---|
| True Process State | Path & Status | Indicated Status | 1/1 logic |
| 0 | 1. test | 0 or 1 | — |

TABLE V-b

| | NOT DURING TEST | | |
|---|---|---|---|
| True Process State | Path & Status | Indicated Status | 1/1 logic |
| 0 | 1. okay | 0 | 0 |

With 1/1 logic, there remains the question of what to do should the testing find the logic to be faulty. Depending on the application and the mean-time-to-repair, it may be acceptable to simply declare the path and system "out-of-service". In other cases, where "out-of-service" cannot be tolerated, this technique is not acceptable.

f. Single path with backup, Time share testing

One path and 1/1 logic can be utilized with a backup, duplicate, path to take over the duty in case of discovery of faulty behavior of the working path. The system organization and use of testing is as in e. above; in addition, in case of detection of faulty behavior, the duty is manually or automatically switched to the backup path. Testing of this backup path would then be done on the same time sharing basis as in e. above. The practical way to use the backup is to operate both paths in parallel at all times with provisions not to use a path which is found to be faulty and to replace this faulty path promptly.

If the mean-time-to-repair is long, additional spare backup paths can be added to provide for the case where two or more paths have become faulty before the first one(s) can be restored to service.

To implement this system using time-share testing essentially with two paths, the following combinatorial logic may be used. Given two paths producing the resultant status word values R1 and R2, the testing yields an estimation that each path is, or is not, working correctly.

Suppose that these tests produce S1 and S2 for the two paths, respectively, where each S has the value 1 if the test has been satisfactory and detected no fault in a path and 0 otherwise. Then, a combined value R may be produced by the following logic equation $$R = R1 \cdot S1 + R2 \cdot S2 + X \quad (A)$$

with $X = \overline{S1} \cdot \overline{S2}$ if it be preferred that R have the value 1 in case of both tests failing, $X = 0$ if not.

This equation A tests the magnitude R1 and R2 and S1 and S2 to off-normal operation of the reactor system and for faultless operation of the monitor. Normal and faultless operation is indicated by R equal to the True Value.

Table VI below shows the results obtained with this logic for the case $X = \overline{S1} \cdot \overline{S2}$ and assuming that a fault in R1 or R2 gives S1 or S2 respectively a value of 0.

TABLE VI

| True Value Digit | R1 | S1 | R2 | S2 | R | Notes |
|---|---|---|---|---|---|---|
| 0 | 0 | 1 | 0 | 1 | 0 | Okay* |
| 1 | 1 | 1 | 1 | 1 | 1 | Okay* |
| 0 | 1 | 0 | 0 | 1 | 0 | Okay* even though path 1 is wrong. |
| 0 | 0 | 1 | 1 | 0 | 0 | Okay* although path 2 is wrong. |
| 0 | 1 | 0 | 1 | 0 | 1 | Both paths wrong, result forced to 1. |
| 1 | 0 | 0 | 1 | 1 | 1 | Okay* even though path 1 is wrong. |
| 1 | 1 | 1 | 0 | 0 | 1 | Okay* even though path 2 is wrong. |
| 1 | 0 | 0 | 0 | 0 | 1 | Okay* even though path 1 and path 2 are both wrong. |

*Okay meaning R is equal to True Value.

If the operation is normal and the circuitry for producing R1 is in good working order, then R1 will always have the same value as True Value Digit. Separately, if the operation is normal and the R2 circuitry is okay, R2 will always have the same value as True Value Digit. S1 has the value 1 if R1 circuitry is okay, 0 if not. S2 has the value 1 if R2 circuitry is okay, 0 if not. R is derived by the logic equation, in R1, R2, S1, S2, using equation A given above.

The table shows that immunity is given against single failures in either path, and testing is included. That is to say, the performance of the overall system is not degraded by the testing, as discussed above in this section. Since, in this system, substantial importance is given to S1 and S2 when correlated with R1 and R2 being correct, it may well be asked if the system works well if S1 or S2, or both, should indicate faults. This can be inspected in the following Table VII.

TABLE VII

| True Value Digit | R1 | S1 | R2 | S2 | R | Notes |
|---|---|---|---|---|---|---|
| 0 | 0 | 1 | 0 | 1 | 0 | Okay* |
| 1 | 1 | 1 | 1 | 1 | 1 | Okay* |
| 0 | 0 | 0 | 0 | 1 | 0 | Okay,* despite error in S1. |
| 1 | 1 | 0 | 1 | 1 | 1 | Okay,* despite error in S1. |
| 0 | 0 | 1 | 0 | 0 | 0 | Okay,* despite error in S2. |
| 1 | 1 | 1 | 1 | 0 | 1 | Okay,* despite error in S2. |
| 0 | 0 | 0 | 0 | 0 | 1 | Both S1 and S2 in error, result forced to 1. |
| 1 | 1 | 0 | 1 | 0 | 1 | Okay,* despite two errors. |

*Okay meaning R is equal to True Value.

It is again assumed in constructing Table VIII that S1 or S2, if correct, should be 0 if R1 or R2 is not equal to the True Value digit. For example, in the third row S1 is in error because R1=0, the True Value, and S1 should be 1.

Table VIII shows that the correct result is given in the presence of one error in S1 or S2, and the correct results or the preferred wrong result ($X = \overline{S1} \cdot \overline{S2}$) is given in case of two errors. Table VIII shows the situation if one S is in error and R1 or R2 manifests off-normal operation.

TABLE VIII

| True Value Digit | R1 | S1 | R2 | S2 | R | Notes |
|---|---|---|---|---|---|---|
| 0 | 0 | 1 | 0 | 1 | 0 | Okay* |
| 1 | 1 | 1 | 1 | 1 | 1 | Okay* |
| 0 | 1 | 0 | 0 | 0 | 1 | R1, S2 both wrong, but result is the preferred outcome 1. |
| 1 | 0 | 0 | 1 | 0 | 1 | R1, S2 wrong, but result okay. |
| 0 | 0 | 0 | 1 | 0 | 1 | R2, S1 both wrong, but result is the preferred outcome 1. |
| 1 | 1 | 0 | 0 | 0 | 1 | R2, S1 both wrong, but result is the preferred outcome 1. |
| 0 | 1 | 1 | 0 | 1 | 1 | R1, S1 both wrong, but result is the preferred, outcome 1. |
| 1 | 0 | 1 | 1 | 1 | 1 | R1, S1 both wrong, but result is okay.* |
| 0 | 0 | 1 | 1 | 1 | 1 | R2, S2 both wrong, but outcome is the preferred 1. |
| 1 | 1 | 1 | 0 | 1 | 1 | R2, S2 both wrong, but outcome is okay.* |

*Okay meaning R is equal to True Value.

Therefore, two paths with time share testing are immune to any single error in either the logic or the testor; furthermore, even with any combination of two errors, the system will still give the correct result or, at worst, the pre-selected preferred outcome, selected here to be 1.

g. Two paths with duplication as a means of testing

One way of testing a path is to duplicate the logic in each path. Intuitively, if the results are identical, one could believe the result; if not, an alarm could be actuated.

A demonstration of this logic system would show it to be similar in overall performance to "two paths with time share testing".

One difference is, however, significant. With "two paths with duplication as a means of testing", the "test" is performed on the live signals, which will usually be in normal, benign, combinations. Therefore, the logic is being tested only for these benign cases until a process upset occurs. Then, if less than 3 errors occur, the result will be acceptable, but the errors are not detected before the upset. With time-share testing, the test is performed with test-input combinations representing upset (as well as benign) combinations. Errors are thus detected before a true upset condition occurs.

Summary of paragraphs a–g

To meet statutory requirements for testing of logic in vital circuits, to maintain complete immunity to single failure, i.e., true result always produced, to maintain satisfactory immunity to double errors, (either in the logic or in the testors or combination thereof), i.e., result being either correct or a preselected preferred outcome such as 1 in the case of two errors, it is possible to select the systems described under paragraphs c, d, f, g. In accordance with this invention the system generally described under f above is provided. f is preferred because f requires only two paths although more than two paths may be included, and f detects errors in the logic as applied to the most important, as opposed to the most common, input conditions before they occur in fact. System g does not. Systems c and d require more than two paths and are therefore in general more expensive and would occupy more space.

In accordance with this invention, monitoring apparatus is provided including at least a first path or first signal-processing unit and a like second path or second signal-processing unit. The status signals from the reactor system being monitored are converted into words and processed as status words in each signal-processing unit. Each digit of each status word has a value indicating the status of the operational process to which it corresponds, for example, 1 if the process is normal and 0 if it is off-normal or vice versa. Test binary words simulating the status words are transmitted to the signal-processing units on a time-sharing basis with the status words. Each signal-processing unit has a pair of memories each of which converts the status words and the test words into converted status words and converted test words. The pairs of converted status words and converted test words are tested for coincidence in each signal-processing unit and an alarm signal is produced if there is non-coincidence. The transmission of status signals and test signals takes place during successive cycles of operation. The duration of a cycle of operation may be short, typically between 100 and several hundred microseconds. The intervals between cycles should be long enough to afford time for disconnects to open, if necessary, typically 10 to 100 milliseconds. There is also, in each signal processing unit, an elapsed-time facility, which operates on alarm if no signal is received by it a predetermined time interval after the start of a cycle. The monitoring apparatus also includes an evaluating unit and an interconnecting unit appropriately interconnecting the signal-processing unit and the evaluating unit. The evaluating unit evaluates the converted status words and the results of the coincidence testing and elapsed time signalling and operates protective means when necessary. The evaluating means only operates the protective apparatus if it receives converted status words from both signal-processing units manifesting off-normality for the same operational processes or fault operation responsive to test words in both signal processing units or combinations of such manifestations.

The apparatus according to this invention has the following advantages.

1. No single random fault defeats the required functioning.

2. No two random faults defeat the required functioning.

3. No single random fault spuriously actuates downstream devices (typically disconnects of protective means).

4. Single faults are detected by the test feature; presence of faults is indicated by creating a special alarm condition output.

5. The test feature does not detract from system reliability because the testing is performed in a shared-time mode. The time allowed for testing is brief in comparison with the time constants of the processes being monitored. For most industrial processes, and in particular for nuclear power plants, the process time constants are thousands to millions of times longer than electronic digital times using modern circuitry.

6. Testing is not blocked.

7. The logic paths are not blocked.

8. The testing does not threaten spurious actuation of downstream devices, i.e. protective means.

9. Testing of one path is independent from testing of the other path and may be synchronized or not.

10. All memory and logic components may be built from low-cost, small, non-volatile Read Only Memory devices which are commercially available from many suppliers and are commonly used in industrial applications.

11. The organization of the apparatus minimizes the cost of changes because any logic change may be accommodated by replacing the device embodying the logic which would be located on the same circuit board. The change would be made once for each path.

12. Incorrect changes would be immediately detected by the testor unless the new logic and the new testor memory contain the identical error.

13. Such changes are amenable to preservice testing since only one circuit board per path is involved. A suitable board-testor could be built with common industrial practices that would completely exercise the board prior to use.

14. Said board-testor could also be used to test the board periodically to test for degradation, or the like, to supplement the on-line logic testing.

15. Because the testor may be located on the same board as the other logic, and because the testor produces an alarm output signal, the presence of an error can be easily indicated by, for example, an error-status lamp on the circuit board. This makes repair simple because the error is indicated at the board level. In many applications, the entire board would be replaced with a qualified spare, with detail repair of the faulty board being made later, off-line, while the system has returned to normal status immediately.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 2 is a block diagram showing monitoring apparatus in accordance with this invention;

FIG. 7 is a typical evaluating logic used in the practice of this invention.

Figure 1:
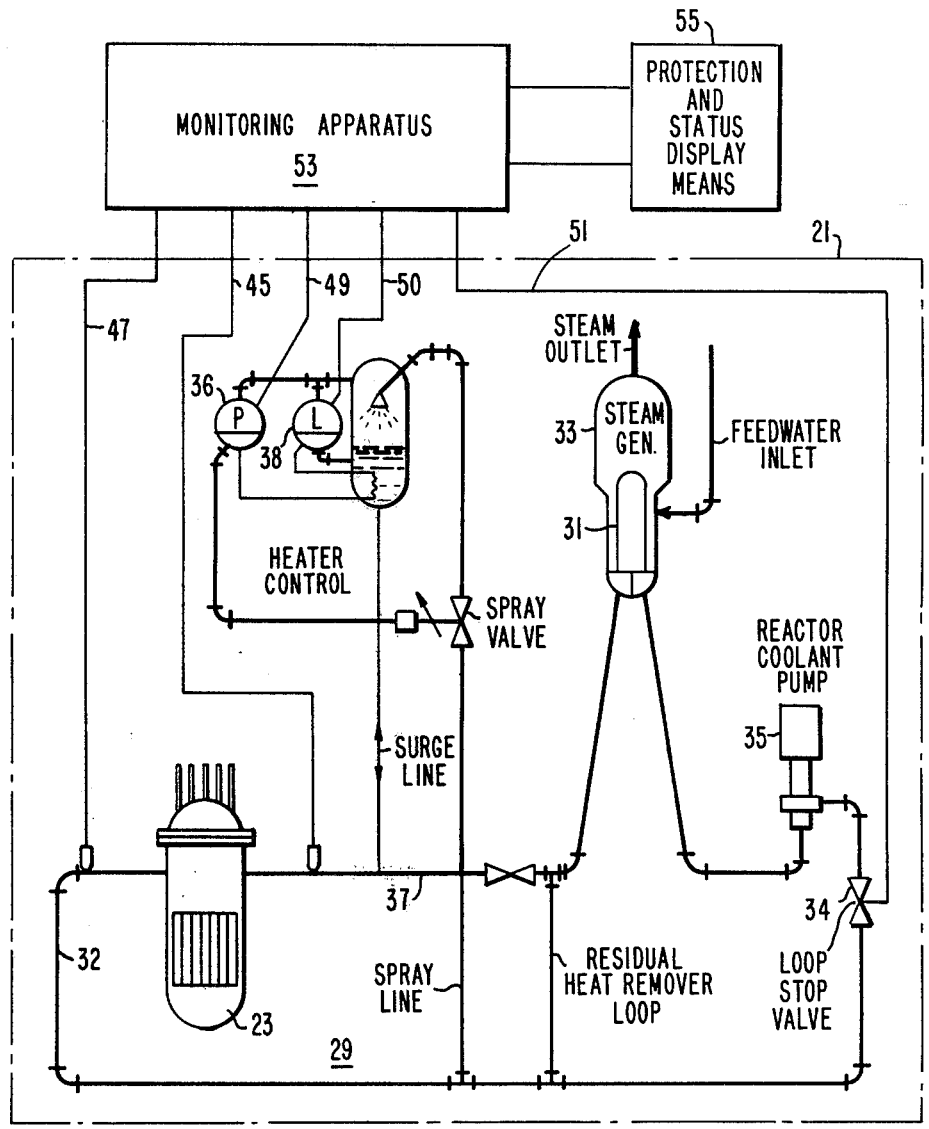
FIG. 1 is a diagrammatic view showing the relationship between a nuclear reactor power system and monitoring apparatus.

In the drawings, heavy arrows represent transmission or transfer of multiple signals or multiple electric circuits and light conductor transmission or transfer of single signals.

DESCRIPTION OF THE PREFERRED EMBODIMENT

The apparatus shown in FIG. 1 includes a reactor system 21 including nuclear reactor 23 and several (but not all) typical auxiliary or appurtenant components. The reactor 23 is typically of the pressurized-water type. The reactor 23 is supplied with coolant through loop 29 having hot leg 37 and cold leg 32. The loop 29 includes a valve 34 and a pump 35 which drives the coolant. Among the typical auxiliary components are a steam generator 33 having secondary coil 31. The primary coil is supplied by the coolant and is connected in the loop 29. There are also pressurizers 36 and 38.

Typically process status signals are derived from the hot leg 37 by line 45, from the cold leg 39 by line 47, from pressurizer 36 by line 49, from pressurizer 38 by line 50, and from the valve 34 by line 51. Lines 45 and 47 carry temperature measurements derived from thermocouples or the like; lines 49 and 50 carry measurements of pressure derived from a pressure measuring device; and line 51 carries a signal indicating whether valve 34 is open or closed. There may of course be other process-state measurements. In addition each process state may be measured by more than one instrument and a separate line may be provided for each instrument.

The apparatus shown in FIG. 1 also includes monitoring apparatus 53. The magnitudes of the operational process parameters are injected into the monitoring apparatus 53 by lines 45 through 51.

The apparatus also includes protective and status display means 55. This means 55 includes disconnects for the nuclear reactor system and lamps and other mechanisms for indicating faults in the monitoring apparatus 53 or in the nuclear reactor system as a whole.

FIG. 2 shows the major components of the monitoring apparatus 53. These include first and second signal-processing units or paths 54 and 56, an interconnecting unit 58, and an evaluating unit 60. Identical status signals from the nuclear reactor system 21 are impressed on the first and second signal-processing units 54 and 56. The outputs of the signal-processing units 54 and 56 are impressed on the interconnecting unit 58 and the outputs of the interconnecting unit 58 are impressed on the evaluating unit 60. The evaluating unit 60 supplies the appropriate command to the protective-and-display-means 55.

Figure 3:
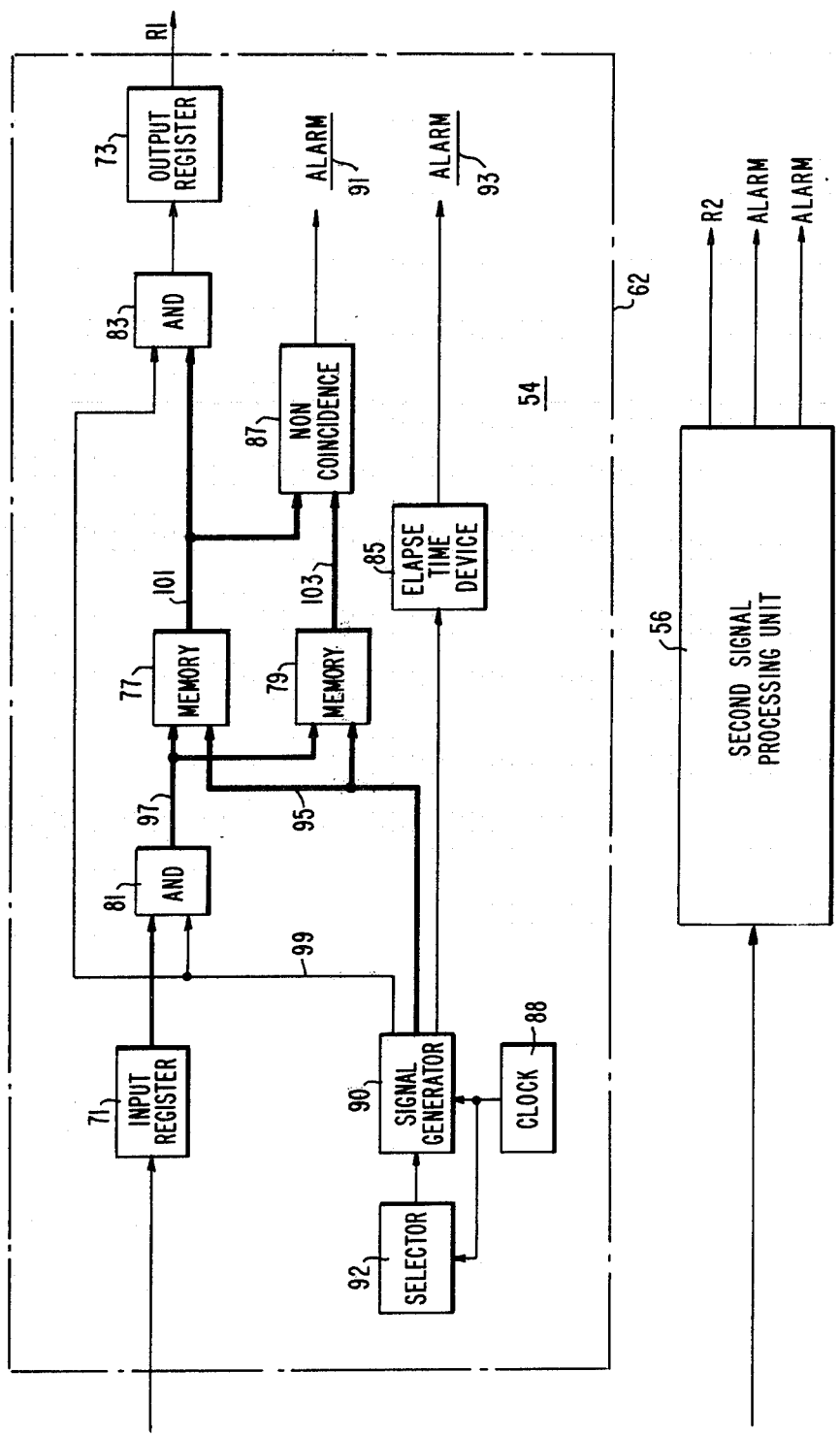
FIG. 3 is a block diagram showing in particular the components of a signal-processing unit (of each path) included in the apparatus shown in FIG. 2.

FIG. 3 shows the components of the first signal-processing unit 54. These components include an input register 71, an output register 73, memories 77 and 79, logic functions, specifically AND's 81 and 83, an elapsed-time device 85, and a non-coincidence 87. Signal-processing unit 54 also includes a signal-generating unit 62 including a clock 88, a signal generator 90 and a selector 92. The clock 88 actuates the signal generator 90 to produce and transmit the signals selected by the selector 92. During each cycle of the clock the input register is actuated to transmit a status word for processing, then a test word is transmitted, then an elapsed-time word is transmitted. Signal-processing unit 56 is identical to signal-processing unit 54.

Figure 4:
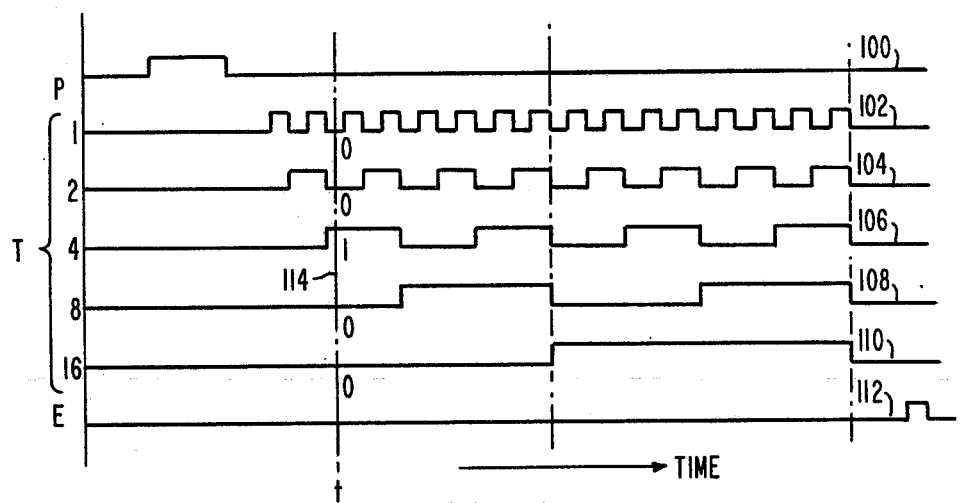
FIG. 4 is a graph showing the relationship of the pulses which initiate the flow of status signals, test signals, and elapsed time signals through the signal-processing units.
Figure 6:
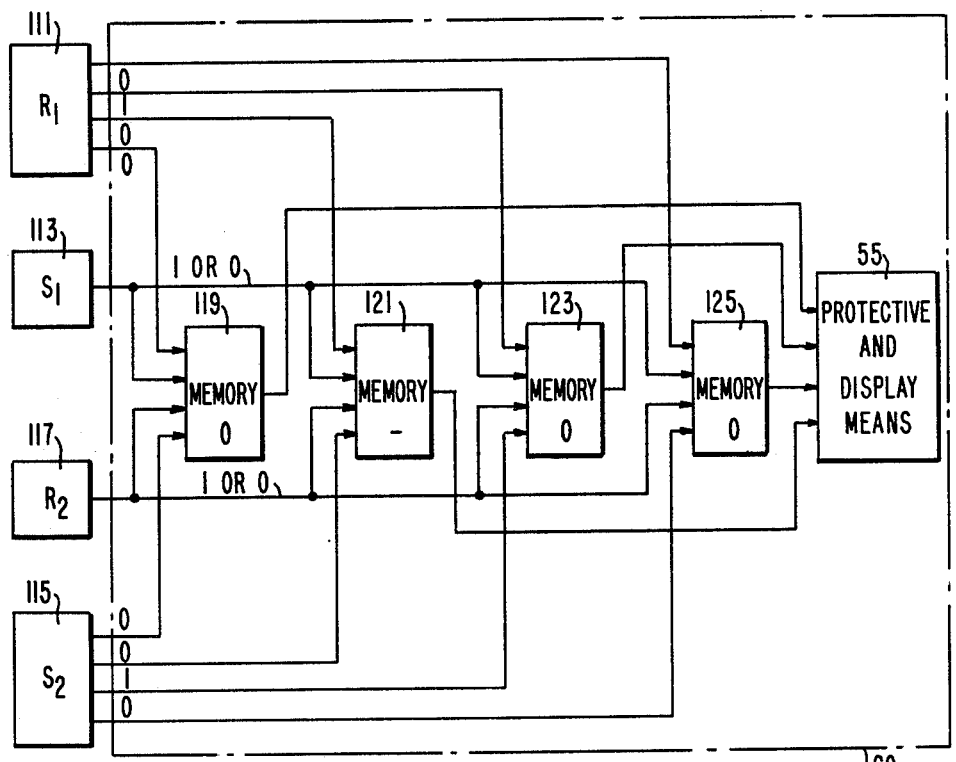
FIG. 6 is a block diagram showing an evaluating unit in accordance with this invention.
Figure 5:
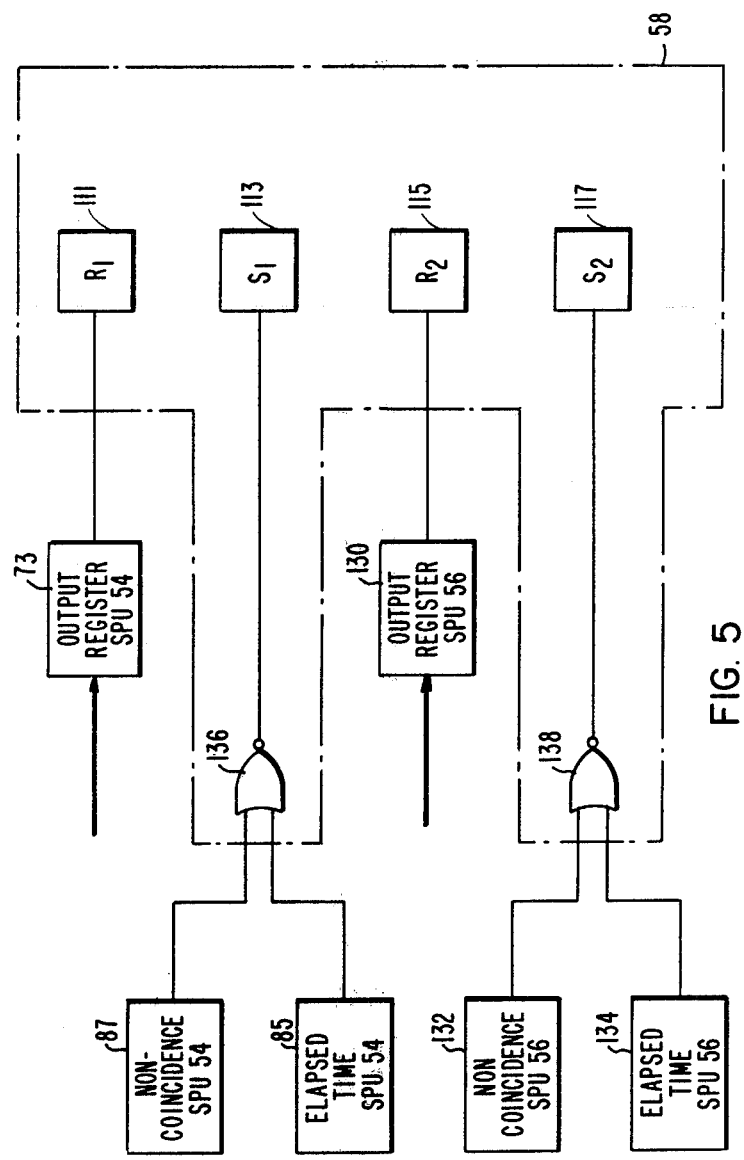
FIG. 5 is a block diagram showing an interconnecting unit included in apparatus in accordance with this invention.

The three different pulses delivered by the signal generator 90 are presented graphically in FIG. 4. In this graph time is plotted horizontally and the magnitude of each pulse vertically. Each pulse or set of pulses extends from a base 0 line 102, 104, 106, 108, 110, 112 and extends to a magnitude of 1. Points along the same vertical line extending through the graphs represent the same instant of time. For example, the points on the line 114 on all graphs occur at the time t. Three sets of pulses P, T and E are presented in FIG. 4. During each clock cycle, the pulse P initiates transmission of status words and test words through the signal-processing units 54 and 56; the pulses T are combined to produce a test word when the signal generator 90 is appropriately enabled by the selector 92. For example, if the signal generator 90 is enabled at time t the last word is 00100. Then the pulse E is transmitted. If the elapsed time device 85 does not produce a pulse E within a predetermined time interval after generation of the signal cycle, there is an alarm 92 indicating that the signal generator unit is not operating properly.

The input register 71 receives the status signals from the lines 45 through 51 of the nuclear reactor system 71 and converts each set of signals into a binary status word. Where five status signals are transmitted as disclosed, each binary status word has five digits or bits.

At the start of each cycle of operation of a signal-processing unit 54, the signal generator 90 enabled by selector 92 generates pulse P into line 99. This enables transmission of an input status word from the input register 71 through the AND 81 through line 97 to the memory 77. The status word is entered into a preassigned address in memory 77. The memory 77 responds to this status word by converting the input status word into a converted status word corresponding to the address in which the status word was entered. The converted status word is transmitted through AND 83, also enabled by the presence of a pulse P on line 99, to the output register 73. The converted status word from memory 77 is also entered into non-coincidence 87 through line 101. At the same time, line 97 also transmits the status word to the other memory 79 where this word is entered into a preassigned address, converted into a converted status word identical to the converted status word of memory 77 and transmitted through line 103 to the non-coincidence 87. The non-coincidence 87 compares the converted status words on lines 101 and 103 bit by bit. In case of non-coincidence, alarm 91 is activated by the non-coincidence 87. The alarm 91 may be a light or other signal on the protective-and-display means 55. A non-coincidence signal is also transmitted to the interconnector unit 58.

Later in time, pulse P is terminated and a series of pulses T are generated by the signal generator 90 into circuit or line 95. These pulses form a test word which circuit 95 transmits to each of the memories 77 and 79. The memory device 77 and 79 accept these test words as address values; the memory devices 77 and 79 produce outputs which are the values stored in the memories at these addresses. The memories 77 and 79 convert the entered test words into converted test words. The converted test words are transmitted through lines 101 and 103 to non-coincidence 87. The non-coincidence 87 compares the test words from line 101 with the test word from line 103 bit by bit. In case of non-coincidence, alarm 91 is activated and the signal of non-coincidence is transmitted to the interconnection unit.

Later in time, the pulses T are terminated and the clock 75 generates pulse E which is transmitted to elapsed-time device 85. This elapsed-time device 85 operates independently of all other circuitry to determine if a pulse E is present. In case pulse E is not received by elapsed-time device 85 within a pre-set time interval, an alarm signal 93 is generated by the elapsed-time device 85. This is a precautionary feature which detects that the signal-generating unit 62 has stopped or failed to complete a complete cycle in the alotted time period. After the elapsed-time check a cycle is terminated.

Each memory of each signal-processing unit 54 and 56 converts the input status word or test word into a converted status word or test word. Typical conversion of the words is shown in the following Table IX.

TABLE IX

| Inputs | | | | | Outputs - Converted Words | | | |
|---|---|---|---|---|---|---|---|---|
| 1 | 2 | 3 | 4 | 5 | 1 | 2 | 3 | 4 |
| 0 | 0 | 0 | 0 | 0 | 0 | 0 | 1 | 0 |
| 0 | 0 | 0 | 0 | 1 | 0 | 0 | 1 | 0 |
| 0 | 0 | 0 | 1 | 0 | 0 | 0 | 0 | 0 |
| 0 | 0 | 0 | 1 | 1 | 1 | 1 | 1 | 1 |
| 0 | 0 | 1 | 0 | 0 | 0 | 1 | 0 | 0 |
| 0 | 0 | 1 | 0 | 1 | 0 | 1 | 0 | 1 |
| 0 | 0 | 1 | 1 | 0 | 1 | 0 | 0 | 0 |
| 0 | 0 | 1 | 1 | 1 | 0 | 0 | 1 | 0 |
| 0 | 1 | 0 | 0 | 0 | 0 | 0 | 0 | 0 |
| 0 | 1 | 0 | 0 | 1 | 1 | 1 | 1 | 0 |
| 0 | 1 | 0 | 1 | 0 | 1 | 0 | 1 | 0 |
| 0 | 1 | 0 | 1 | 1 | 1 | 1 | 1 | 0 |
| 0 | 1 | 1 | 0 | 0 | 0 | 1 | 1 | 0 |
| 0 | 1 | 1 | 0 | 1 | 0 | 0 | 0 | 1 |
| 0 | 1 | 1 | 1 | 0 | 1 | 0 | 0 | 0 |
| 0 | 1 | 1 | 1 | 1 | 0 | 1 | 0 | 0 |
| 1 | 0 | 0 | 0 | 0 | 0 | 0 | 1 | 0 |
| 1 | 0 | 0 | 0 | 1 | 0 | 0 | 0 | 1 |
| 1 | 0 | 0 | 1 | 0 | 1 | 0 | 0 | 1 |
| 1 | 0 | 0 | 1 | 1 | 0 | 1 | 1 | 0 |
| 1 | 0 | 1 | 0 | 0 | 1 | 0 | 1 | 0 |
| 1 | 0 | 1 | 0 | 1 | 1 | 1 | 1 | 0 |
| 1 | 0 | 1 | 1 | 0 | 0 | 0 | 0 | 0 |
| 1 | 0 | 1 | 1 | 1 | 0 | 0 | 0 | 0 |
| 1 | 1 | 0 | 0 | 0 | 1 | 0 | 0 | 0 |
| 1 | 1 | 0 | 0 | 1 | 1 | 1 | 0 | 0 |
| 1 | 1 | 0 | 1 | 0 | 1 | 1 | 1 | 1 |
| 1 | 1 | 0 | 1 | 1 | 0 | 1 | 0 | 1 |
| 1 | 1 | 1 | 0 | 0 | 0 | 0 | 1 | 0 |
| 1 | 1 | 1 | 0 | 1 | 1 | 1 | 0 | 0 |
| 1 | 1 | 1 | 1 | 0 | 0 | 0 | 1 | 1 |
| 1 | 1 | 1 | 1 | 1 | 0 | 0 | 0 | 1 |

All pairs of converted words, status and test, derived from each memory 77 and 79 are compared in each non-coincidence 87 of each path or signal-processing unit 54 and 56. Thus the integrity of each unit 54 and 56 is thoroughly tested. The converted status words are transmitted to each output register for further processing.

There are various ways to produce, with digital circuits, the desired outputs. In this invention, digital memory devices are used. The output values are stored in the memory at the addresses given by the numerical value of the input combination. For example, the outputs corresponding to the Inputs 01011 is found by entering the memory at address 01011, and reading the value stored at this address, namely, 1110. From the table above, it will be seen that all possible input combinations are shown, so that the output can be found for any possible input.

If it is desired to change the outputs, which is to say, to change the logic equations, the values stored in the memory may be changed. In practical circuits using fixed value memories, this would mean discarding the memory device and physically replacing it with another memory device. Such devices are low in cost and are readily available from commercial suppliers.

The interconnecting unit 58 includes NOR's 136 and 138 and registers 111, 113, 115 and 117 designated respectively R1, S1, R2, S2. The output register 73 of signal-processing unit or path 54 supplies converted status words digit by digit to register 111; the output register 130 of signal-processing unit 56 supplies converted status words digit by digit to register 115. The non-coincidence 87 and the elapsed-time 85 of signal-processing unit 54 supply their outputs, if any, to NOR 136. If there is no non-coincidence and the signal E (FIG. 4) is produced before the elapsed time in the signal-processing unit 54 expires, the outputs of non-coincidence and elapsed time are 0 and the output of NOR 136 is 1. If there is non-coincidence or a signal E after elapsed time, the output of NOR 136 is 0. Likewise the outputs of the non-coincidence 132 and the elapsed time 138 of signal-processing unit 56 are supplied to NOR 138. The output of NOR 138 is 1 in the absence of non-coincidence or if a signal E is recorded before expiration of the elapsed time and a 0 if neither of these events occur.

To combine the logic results of the two paths or signal-processing units 54 and 56, use is made of the explanatory development under the section designated f above, in which, for a single output value, a best possible combined-output from two paths (54, 56), one or both of which may be faulty, is produced. In the example at hand, four outputs are considered. This is achieved by replicating four times the circuit for one output. In the general case, more or fewer outputs may be treated the same way.

The logic process is carried out in the evaluating unit 60. This unit includes memories 119, 121, 123, 125. Corresponding digits of converted status words from the signal-processing units 54 and 56 are supplied respectively to the memories 119, 121, 123, 125 through the registers 111 and 115. A typical converted status word may be 0010. The corresponding digits of this word are supplied respectively to memories 119, 121, 123 and 125. The corresponding outputs of the NOR's 136 and 138 which constitute the digital results of comparison of the test words and the test for elapsed time are supplied to all memories 119, 121, 123, 125 through registers 113 and 117.

The memories 119 through 123 include the logic for evaluating each set of digits typically by use of equation (A). A typical network for carrying out this evaluation is shown in FIG. 7. This network includes AND's 150 and 152, NOR 154, and OR 156. The respective R1 digits and the S1 digit are in each memory 119 through 123 supplied to the AND 150, the respective R2 digits and the S2 are supplied to the AND 152 in each memory 119 through 123, and the S1 and S2 digits are supplied to the NOR 154. The outputs of the AND's 150 and 152 and of the NOR 154 are supplied to the OR 156. The output of the OR 156 is R, the solution of equation (A). The content of each memory 119 through 123 for different values of R1, R2, S1, S2 is shown in the following Table X.

TABLE X

| R1-bit | S1 | R2-bit | S2 | Memory Content |
|---|---|---|---|---|
| 0 | 0 | 0 | 0 | 1 |
| 0 | 0 | 0 | 1 | 0 |
| 0 | 0 | 1 | 0 | 1 |
| 0 | 0 | 1 | 1 | 1 |
| 0 | 1 | 0 | 0 | 0 |
| 0 | 1 | 0 | 1 | 0 |
| 0 | 1 | 1 | 0 | 0 |
| 0 | 1 | 1 | 1 | 1 |
| 1 | 0 | 0 | 0 | 1 |

TABLE X-continued

| R1-bit | S1 | R2-bit | S2 | Memory Content |
|---|---|---|---|---|
| 1 | 0 | 0 | 1 | 0 |
| 1 | 0 | 1 | 0 | 1 |
| 1 | 0 | 1 | 1 | 1 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

The outputs of the memories 119 through 123 are supplied to the protective and display means. Various combinations of these outputs where R is not the true value provide protective action (e.g. opening of disconnects) for various combinations of off-normal operation of the reactor system 21 and/or faulty operation of paths 54 and 56. R is not the true values where both path 54 and path 56 detect off-normal operation or both parts detect faults, non-coincidence or failure to receive signal E within the preset elapsed-time interval. Under such circumstances, the protective means are operated.

In this application, the words "fault" or "faulty" refer to defects in the monitoring apparatus. The expression "off-normal" refers to defective operation of a reactor system.

While a preferred embodiment of this invention has been disclosed herein, many modifications thereof are feasible. This invention is not to be restricted except insofar as is necessitated by the spirit of the prior art.

I claim:

1. Apparatus for monitoring the operation of a nuclear reactor system having a plurality of process states which may be desirably normal or undesirably off-normal, the said reactor having a plurality of means, each responsive to a said process state, to produce a status signal indicative of the status, whether normal or off-normal, of the process state to which it is responsive, the said reactor system also including protective means, the said monitoring apparatus including a first monitoring path including a first signal-processing unit and a second monitoring path including second signal-processing unit, means connecting said status signal-producing means to said first and second signal-processing units when said first or second signal-processing unit is enabled, for transmitting for processing the status signals produced by said status signal-producing means, a signal-evaluating unit, means connecting said signal-processing units to said signal-evaluating units, said signal-evaluating unit including means for evaluating signals processed by said processing units, means connected to each of said signal-processing units, for enabling each of said signal-processing unit to transmit status signals for processing through said signal-processing units, means connected to each of said signal-processing units, for enabling each of said signal-processing units, on the transmission of status signals, to transmit its corresponding processed status signals to said evaluating unit, means for producing test signals simulating said status signals, means connected to said test-signal-producing means, for enabling said test-signal-producing means to transmit test signals to said first and second signal-processing units, on a time-sharing basis with the transmission of status signals, during the times when said signal-processing units are not enabled as aforesaid to transmit status signals, the connecting means between said first and second signal-processing units and said evaluating unit including means for transmitting indication of detected faults, if any, to said evaluating unit, means connecting said evaluating unit to said protective means, for actuating said protective means on the evaluation by said evaluating means of a manifestation of off-normal operation or of detection of faults in both said signal-processing units.

2. The apparatus of claim 1 wherein the status signals are transmitted to the signal-processing units as digital status binary words formed of a number of bits equal in number to the number of status signals produced by the status signal-producing means and the test signals are supplied to said signal-processing units as binary test words formed of the same number of digital bits, the test words simulating the status words both where said status words manifest a normality of a process and where they manifest an off-normality of a process.

3. The apparatus of claim 1 including means responsive to faulty operation of a said signal-processing unit, for indicating fault operation of said signal-processing unit.

4. The apparatus of claim 2 wherein each signal-processing unit includes a plurality of memories each memory having an address for each word and each memory including means for converting each status word and each test word transmitted to a memory into a converted status word and a converted test word respectively, the said apparatus also including non-coincidence means for comparing a converted status word or a converted test word of a memory with the corresponding word of another memory, and means, responsive to non-coincidence of compared words, for indicating said non-coincidence thereby to detect fault in any of said signal-processing units.

5. The apparatus of claim 1 wherein the signal-processing units are enabled to receive status signals and the test-signal-producing means is enabled to impress test signals on said units in succession during successive cycles of operation of the monitoring apparatus.

6. The apparatus of claim 5 including signal-generating means for generating signals to enable the signal-processing units and the test-signal-producing means as recited in claim 1, the said signal-generating means also including means for generating an elapsed-time signal during each cycle following the enabling of the test-signal-producing means, means for detecting said elapsed-time signal and for indicating if, undesirably the elapsed-time signal has not been detected, within a predetermined time interval after initiation of said cycle.

7. The apparatus of claim 4 wherein the evaluating unit includes a plurality of evaluating means, at least equal in number to the number of digits of the converted status words, means connecting the first and second signal-processing units each to a said evaluating means, to supply to each a different digit of a converted status word from the first signal-processing unit and a corresponding digit of a converted status word from the second signal-processing unit, the actuating means for the protective means including connections between each evaluating means and the protective means, for actuating said protective means on the presence of digits in the converted status word indicating off-normal operation both in said first signal-processing unit and in said second signal-processing unit.

8. The apparatus of claim 4 wherein the evaluating unit includes a plurality of evaluating means at least equal in number to the converted status or test words, means connecting the first and second signal-processing units, each to a said evaluating means, when enabled, to supply to each a different digit of a converted status word from the first signal-processing unit and a corresponding digit of a converted status word from the second signal-processing unit, means connecting the non-coincidence means of said first signal-processing unit and the non-coincidence means of the second signal-processing unit to each said evaluating means, to supply to each evaluating means a signal, if any, indicating non-coincidence, the actuating means for the protective means including connections between each evaluating means and the protective means for actuating the protective means on the presence in said evaluating means, both from said first signal-processing unit and said second signal-processing unit, a digit of a converted status word indicated off-normal operation or a signal indicating non-coincidence.

9. The apparatus of claim 5 wherein the evaluating unit includes a plurality of evaluating means at least equal in number to the converted status or test words, means connecting the first and second signal-processing units, each to a said evaluating means, when enabled, to supply to each a different digit of a converted status word from the first signal-processing unit and a corresponding digit of a converted status word from the second signal-processing unit, the said apparatus also including means for generating a third signal on the initiation of a cycle of operation of the monitoring apparatus, means for detecting said third signal, and elapsed-time means for producing an elapsed-time signal if, undesirably, the third signal has not been detected a predetermined time interval after said initiation of said cycle, and means, connecting the elapsed-time means of said first signal-processing unit and said second signal-processing unit to each of said evaluating means, to supply to each evaluating means said elapsed-time signal, if any, the actuating means for the protective means including connections between each evaluating means and the protective means for actuating the protective means on the presence in said evaluating means, both from said first signal-processing unit and from said second signal-processing unit, a digit of a converted status word indicated off-normal operation or an elapsed-time signal.

10. The apparatus of claim 4 wherein the signal-processing units are enabled to receive and process status signals and the test-signal-producing means is enabled to impress test-signals on said units in succession during successive cycles of operation of the monitoring apparatus.

11. The apparatus of claim 10 wherein the evaluating unit includes a plurality of evaluating means at least equal in number to the converted status or test words, means connecting the first and second signal-processing units, each to a said evaluating means, when enabled, to supply to each a different digit of a converted status word from the first signal-processing unit and a corresponding digit of a converted status word from the second signal-processing unit, means, connecting the non-coincidence means of said first signal-processing unit and the non-coincidence means of the second signal-processing unit to each said evaluating means, to supply to each evaluating means a signal, if any, indicating non-coincidence, the said apparatus also including means for generating a third signal following the initiation of a cycle of operation of the monitoring apparatus, and elapsed-time means for detecting said third signal or for producing an elapsed-time signal if, undesirably, the third signal has not been detected a predetermined interval after initiation of the cycle of operation of the monitoring apparatus, and means, connecting the elapsed-time means of said first signal-processing unit and of said second signal-processing unit to each of said evaluating means, to supply to each evaluating means an elapsed-time signal if any, the actuating means for the protective means including means for actuating the protective means on the presence in said evaluating means, from said first signal-processing unit and from said second signal-processing unit, a digit of a converted status word indicated off-normal operation or a signal indicating non-coincidence or an elapsed-time signal.

12. The apparatus of claim 1 wherein the means for transmitting status signals for processing, when enabled, transmits identical signals from the nuclear reactor to the first and second signal-processing units.

13. The apparatus of claim 1 wherein, during each cycle of operation of each signal-processing unit, the status-signal-transmitting means is enabled to transmit a status signal for processing by said last-named unit and then, during the same cycle, the test-signal-producing means is enabled to transmit a test signal for processing through said last-named signal processing unit.

14. The apparatus of claim 1 wherein the first and second signal-processing units are alike and are similarly connected to the status-signal producing means.

* * * * *